Aug. 9, 1949.  J. H. ANDERSON  2,478,735
BICYCLE REFLECTOR PEDAL
Filed Oct. 16, 1946

Inventor
JOSEPH H. ANDERSON

By Clarence A. O'Brien
and Harvey B. Jackson
Attorneys

Patented Aug. 9, 1949

2,478,735

UNITED STATES PATENT OFFICE 2,478,735

BICYCLE REFLECTOR PEDAL

Joseph H. Anderson, Kokomo, Ind.

Application October 16, 1946, Serial No. 703,657

1 Claim. (Cl. 88—81)

This invention relates to new and useful improvements in a reflector for bicycle pedals and the primary feature of the invention is to provide a bicycle pedal of the class described having a reflecting means whereby the rider of a bicycle may be visible at night time to the occupants of an approaching automobile having lighted headlights whether the automobile is approaching the bicycle rider and bicycle from the front, the rear, or either side.

Another feature of this invention is to provide a reflecting device which can easily and quickly be attached to a conventional bicycle pedal.

A further feature of this invention is to provide a device of this class that is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which;

Figure 1:
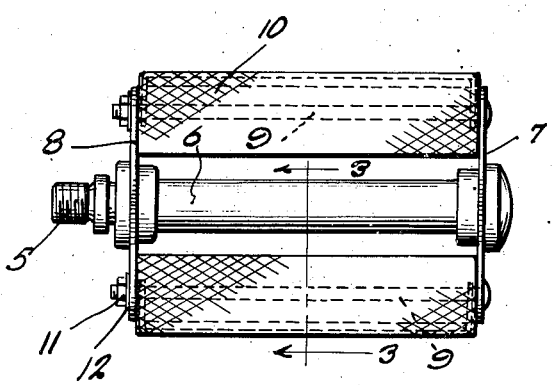
Figure 1 is a side elevational view of a bicycle pedal showing the invention applied.

Referring now to the drawing in detail, wherein, for the purpose of illustration, I have disclosed a preferred embodiment of the invention, the numeral 5 represents a supporting shaft extending through a spacing sleeve 6, the spacing sleeve lying between a pair of similar cross plates 7 and 8. Secured to the ends of cross plates 7 and 8 are bolts 9 which extend through rubber or flexible pads 10 being serrated along their edges as indicated at 10a, nuts 11 and washers 12 being secured on these bolts 9 to retain the structure in assembled form. The frame constituting the cross plates 7 and 8, the bolts 9 and the pads 10 are rotatable freely about the shaft 5 as an axis.

The foregoing is a conventional type of bicycle pedal, various types of bicycles having pedals varying slightly in structure from that illustrated.

The outer faces of pads 10 are cut inwardly to form rectangular longitudinal grooves adapted to receive rectangular tray-like holders 13, said holders being open at the top to hold therein conventional reflecting glass strips 14.

Figure 2:
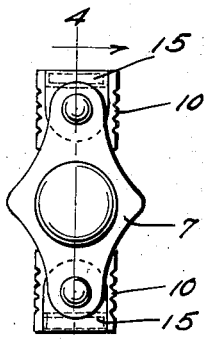
Figure 2 is an end elevational view thereof.
Figure 3:
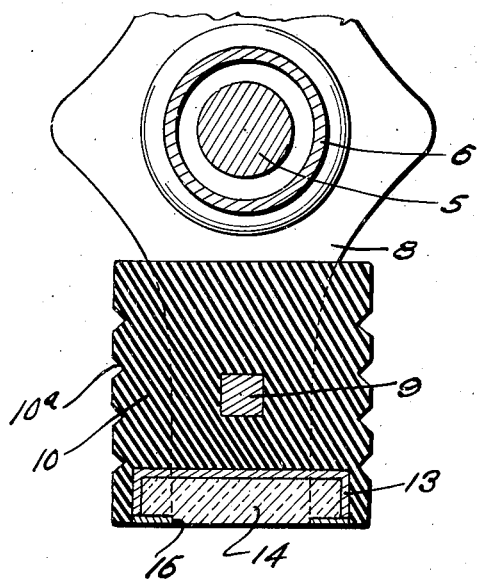
Figure 3 is an enlarged sectional view taken on line 3—3 of Figure 1.
Figure 4:
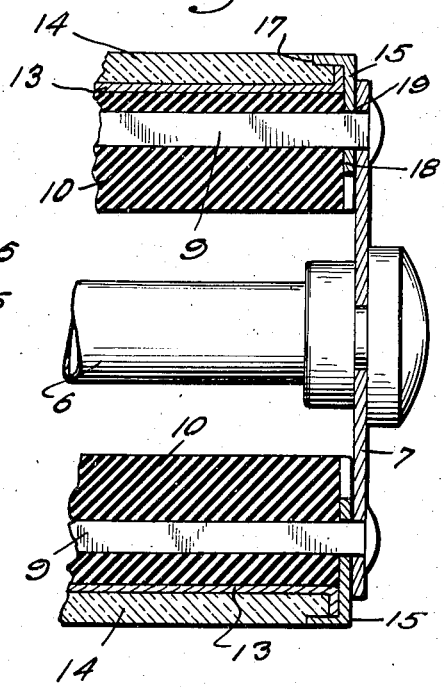
Figure 4 is an enlarged sectional view taken on line 4—4 of Figure 2.
Figure 5:
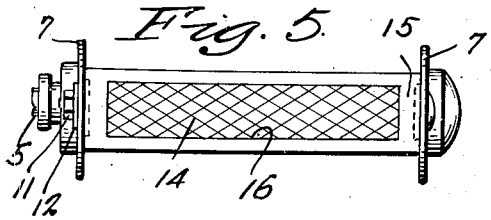
Figure 5 is a top plan view of a bicycle pedal showing the invention applied thereto.

Substantially channel shaped members 15 have rectangular window openings 16 with the edges of the openings overlying the ends of the holders 13 and resting on shoulders 17 formed on the outer edge of the reflecting glass as shown in Figure 2. The flanges 18 of channel members 15 are rounded and have squared openings 19 adapted for mounting on bolts 9 so that the flanges rest between the inner faces of cross plates 7 and 8 and ends of pads 10.

The reflecting glasses are thereby held to the outer faces of the pads and rotate with the pads 10 about shaft 5.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A bicycle pedal comprising a pair of cross plates, rods extending between said cross plates, resilient pads mounted on said rods and having longitudinally extending grooves therein, tray shaped holders extending substantially the full length of said pads and positioned within said grooves, reflector elements mounted in said holders, channel members having flanges at the ends thereof, said channel members having window openings therein and positioned over said reflector elements, said flanges being interposed between the ends of said pads and said cross plates, said flanges having apertures therein, said rods extending through said apertures maintaining the reflector elements and tray like holders assembled.

JOSEPH H. ANDERSON.

REFERENCES CITED

The following references are of record in the file of this patent:

UNITED STATES PATENTS

| Number | Name | Date |
|---|---|---|
| 2,011,850 | Clarke | Aug. 20, 1935 |
| 2,151,144 | Penny et al. | Mar. 21, 1939 |

FOREIGN PATENTS

| Number | Country | Date |
|---|---|---|
| 384,425 | Great Britain | Dec. 8, 1932 |
| 406,089 | Great Britain | Feb. 22, 1934 |
| 668,458 | Germany | Dec. 3, 1938 |
| 508,910 | Great Britain | July 7, 1939 |
| 705,215 | Germany | Apr. 21, 1941 |